Aug. 25, 1959 H. K. HAZEL 2,901,127

ARTICLE FORMING AND INSERTING TOOL

Filed May 1, 1957

INVENTOR
HERBERT K. HAZEL
BY Marshall M. Gruey
ATTORNEY 2,901,127

ARTICLE FORMING AND INSERTING TOOL

Herbert K. Hazel, Kingston, N.Y., assignor to International Business Machines Corporation, New York, N.Y., a corporation of New York Application May 1, 1957, Serial No. 656,243

14 Claims. (Cl. 214—1)

This invention relates to an improved article inserting tool and more specifically to a tool which automatically forms the leads of an electrical component and inserts the ends of the leads in a printed-circuit card.

Printed-circuit cards are widely used as a chassis for electrical components and have, as a principal advantage, a low unit cost due to the fact that electrical circuits may be formed thereon by automatic means. To further reduce the cost of the final product, namely, the card with components connected thereto to form complete circuits, automatic machines have been developed to insert the components at predetermined positions in the card according to a program set in the machine. A typical example of article inserting apparatus is described and claimed in the copending application of W. L. Clarke, Serial No. 655,433, filed April 26, 1957, now Patent No. 2,866,201, in which the component inserting tool of the present invention is used to insert components in a card rapidly and accurately to provide an assembly.

Briefly stated, the improved component inserting tool of the present invention is located above a selected position of a printed-circuit card, an electrical component is engaged with a forming device of the inserting tool, the leads are then formed in a manner to permit the ends of the leads to be received in openings in the card, the forming device moves the component to the card where the ends of the component leads are inserted in the openings of the selected card position, and finally the component is released and the forming device is withdrawn. The inserting tool comprises a cylinder, a pair of pistons for reciprocation within the cylinder, each piston being coupled to a respective one of a pair of elements of the forming device, and means for directing fluid under pressure within the cylinder to move one piston and its respective forming element toward the component and bend the component leads; to move both pistons as a unit toward the card thereby moving the forming device to a position where the ends of the leads are received in the opening in the card; to move the first piston away from the component and cause the component to be released; and to move both pistons away from the card to withdraw the forming device from the component. In the preferred embodiment, the pistons are caused to move in the sequence described above by two sources of compressed air and transfer openings in one of the pistons, where air at one pressure is constantly applied and air at greater pressure is applied once each inserting cycle and then removed.

It is an object of this invention to provide an improved article inserting tool.

It is an object of this invention to provide an improved component forming and inserting tool.

It is another object of this invention to provide an improved pneumatic tool for forming and inserting components in a card using a single controllable source of fluid under pressure.

It is another object of this invention to provide an improved mechanism for forming and inserting an electrical component in a printed-circuit card, the mechanism having a component holding and forming device operated by a pair of pistons in a cylinder which are moved in response to the application of compressed air.

It is another object of this invention to provide a pneumatic tool for operating an article forming and positioning device which has a casing with an opening at one end, a tubular member slidably received in the opening, a first piston slidable in the casing and having a central opening therethrough and connected to the tubular member, a second piston slidable in the casing and connected to the bar and having an opening through its width, a spring mounted between the pistons, bias applied to the first piston for moving the first piston toward the second piston, an article holding device including a pair of elements, one connected to the rod and the other to the bar, and means for applying fluid under pressure between the pistons and thereby moving the first piston until its respective element clamps the article, when the fluid moves the second piston causing both elements to move the article to a position removed from the first.

It is a still further object of this invention to provide an article forming and positioning device which has a casing with an opening at one end, a tubular member slidable in the opening, a first piston slidable in the casing and having a central opening therethrough and connected to the tubular member, a second piston slidable in the casing and connected to the bar and having an opening through its width, a spring mounted between the pistons, bias applied to the first piston for moving the latter toward the second piston, an article holding device including a pair of elements, one connected to the rod and the other pivotally coupled to the bar, a valve for supplying fluid under pressure between the pistons, and an exhaust of larger cross-section than the opening in the second piston effective when the valve is cut off.

Other objects of the invention will be pointed out in the following description and claims and illustrated in the accompanying drawings, which disclose by way of example, the principle of the invention and the best mode which has been contemplated of applying that principle.

Figures 1, 2, 3, 4:
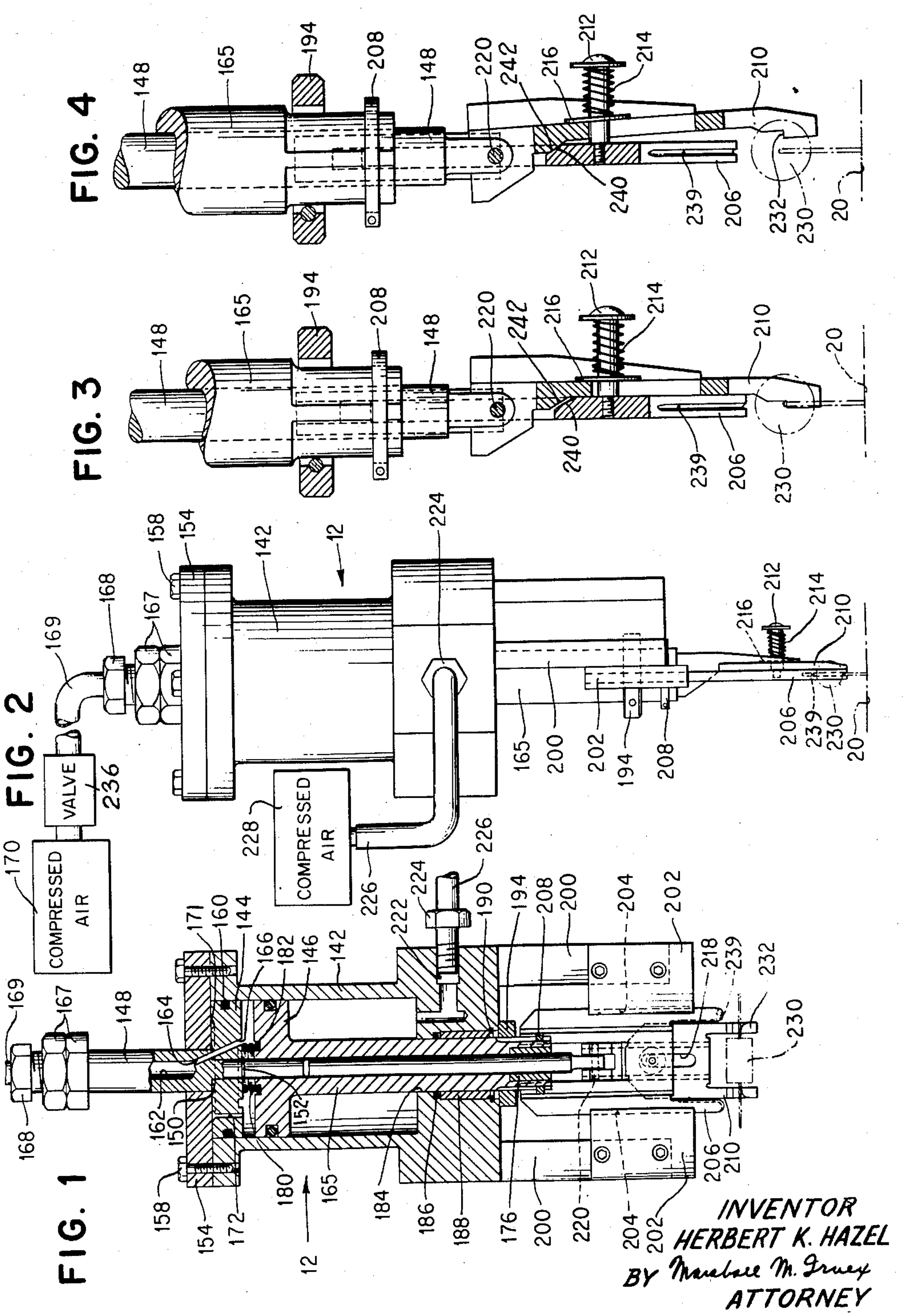
Figure 1 is a front view of the forming and inserting tool partly in section.
Figure 2 is a side view of the tool shown in Figure 1 with the forming device in the closed position.
Figure 3 is a side view of a portion of the tool, partly in section, illustrating the first step in releasing the component.
Figure 4 is a side view of a portion of the tool, partly in section, illustrating the second step in releasing the component.

In Figure 1, there is shown a housing 142 which contains within its bore a top piston 144 and a bottom piston 146, each piston having the usual piston ring such as the ring 160 for engagement with the cylinder walls in the well-known manner. A piston rod 148 is passed through a central opening of the top piston 144 and is held to the latter by a hub face 150 and a snap ring 152. An opening 162 extends axially from the top of the piston rod 148 to an opening 164 of reduced diameter, the latter extending downwardly from the opening 162 to the face of the piston 144. In alignment with the opening 162 is an opening 166 through the piston 144. The upper end of the piston rod 148 is threaded to receive a pair of hex nuts 167, the latter serving to adjustably limit the downward travel of the piston 144 and rod 148 by engagement with a housing top 154. The threads also receive a connector 168, which couples an air hose 169 to the opening 162. With this arrangement of parts, air under pressure supplied through the hose enters the chamber between pistons 144 and 146.

A circular groove 170 is cut in the upper face of the piston 144, and an orifice 172 extends from the groove 170 through the width of the piston 144. The diameter of the orifice 172 is less than the diameter of the openings 164 and 166 in the piston rod 148 and piston 144 respectively.

The bottom piston 146 has an integral rod 165 extending downwardly through the cylinder, and the piston rod 148 extends through an axial opening in the former with the seal ring positioned in a groove of the rod 148. A cylindrical bearing 176 is fixed within the lower portion of the rod 165 and engages the rod 148. A spring 180 is positioned about the rod 148 between the pistons and is held in a groove 182 in the upper surface of the piston 146. In the position shown in Figure 1, the spring is compressed between the two pistons.

The rod 165 and the coaxial rod 148 pass through an opening 184 in the lower end of the cylinder housing. A seal ring 186 is positioned by a groove in the opening 184 and engages the rod of the piston 184, while a cylindrical bearing 188 contained in the housing with a snap ring 190 furnishes guiding support for the piston rod. A stop ring 194 is fixed to the rod 165 with a pin and limits the upward travel of the piston 146.

A pair of brackets 200 extend below the housing and support a pair of guide blocks 202 attached thereto with screws. The guide blocks 202 have grooves 204, which slidably embrace a front forming tool 206 and permit vertical motion of the latter. The upper portion of the front forming tool 206 is secured to the piston rod 165 by grooves in each member which receive a key 208.

As shown in Figure 2, a rear forming tool 210 is slidably engaged with the front forming tool 206 and held thereto by a screw 212. The screw 212 passes through a spring 214, a washer 216 and a slot 218 in the rear forming tool and is secured to the front forming tool 206. Accordingly, the forming tools are slidable with respect to each other, and the rear forming tool 210 may move away from the front forming tool compressing the spring 214 in a manner to be described later. As shown in Figures 1 and 3, the rear forming tool is pivotally connected to the piston rod 148 with a pin 220.

In Figure 1, an opening 222 is arranged in the housing 142 to admit air into the chamber below the piston 146. A supply of air under pressure for example, 40 p.s.i., is constantly applied to this opening by way of a connector 224 and a hose 226 from a source 228.

To explain the operation of the inserting tool 140 by example, assume that an electrical component 230 is transferred to the tool and that the leads of the component rest upon a pair of curved shoulders 232 on the rear forming tool 210 as shown in Figure 1. At this time, air under pressure greater than 40 p.s.i., for example, 80 p.s.i., is admitted to the opening 162. The air at 80 p.s.i. acts upon the pistons 144 and 146 and tends to move them apart, but the piston 144 is prevented from upward movement by the cap 154. Therefore, the piston 146 is moved downwardly against the counter force due to the 40 p.s.i. air in the lower chamber. The air at 80 p.s.i. is also applied through the opening 172 to the groove 170 to act upon the upper piston 144, but the effective area against which the pressure is applied is small and the resultant force is slight. Accordingly, the lower piston 146 moves downwardly until the end of the rod 165 engages the top of the rear forming tool 210. During this movement, it will be noted that a pair of grooves 239 engage the component leads bending the latter over the rounded shoulders 232. Thus, the leads of the component are now formed for insertion into openings in the card 20.

Since the lower piston cannot move downward with respect to the upper piston 144 due to the rod 165 engaging the tool 210, the size of the chamber formed between the pistons 144 and 146 is fixed, and the air applied through the opening 172 to the groove 170 is effective to act upon the piston 144 and move both pistons downwardly as a unit. Piston 146 does substantially all of the pulling. As soon as the piston 144 moves away from the cap 154, the air is directly effective upon the large area of the piston 144 and both pistons move down to the limit where the nut 167 engages the cylinder top 154. It is pointed out that movement of the piston 144 permits air to act on the total area of piston 144. When the nut 167 engages the cylinder top, the ends of the component leads are positioned with the openings of the card 20.

It is apparent that the pistons must not move upwardly together since the component leads are secured within portions of the forming tools. Therefore a short time after the 80 p.s.i. air pressure is removed, the 40 p.s.i. air is effective to move the lower piston 146 upwardly with respect to the upper piston, the reason being that the air between the upper piston 144 and the cylinder top 154 must exhaust through the small orifice 172 and be returned to the opening 162 while the air between the pistons exhausts directly through the opening 166. Therefore, the front forming tool attached to the lower piston 146 and the rod 165 moves upwardly to the position shown in Figure 3. At this time, attention is called to a cam surface 240 on the front forming tool 206 and a cam surface 242 on the rear forming tool 210. As shown in Figure 4, additional upward movement of the lower piston 146 and the rod 165 cause the cam surfaces 240 and 242 to act as shown in Figure 4 and pivot the rear forming tool 210 away from the component leads. At this time, the pistons have moved together, the spring 180 is compressed accordingly, and the pistons move upwardly together carrying the forming tools 206 and 210 away from the component in the relative positions shown in Figure 4 until the lower piston 146 is stopped by the stop ring engaging the cylinder. With the lower piston 146 at rest, the spring 180 causes the upper piston 144 to engage to housing top 154, and this additional movement disengages the cam surfaces 240 and 242 and restores the parts to the position shown in Figure 1. The apparatus for cyclically controlling the supply of air at 80 p.s.i. to the head is described in copending application Serial No. 655,433, now Patent No. 2,866,201, referred to previously.

Although the piston rod 148 has been shown in the preferred embodiment to be a multi-purpose member; namely, a driving, stroke limiting and fluid carrying element; it will be understood that the functions other than the driving one may be performed by other members. The fluid under pressure may be introduced between the pistons 144 and 146 in numerous ways. For example, the opening 166 in the piston 144 may be constructed to terminate adjacent the cap 154 instead of at the rod 148, an opening equivalent to the opening 164 in the rod 148 may be constructed in the cap 154, and a tube may be connected to the opening in the piston and extended through the opening in the cap. Then, the compressed air is connected to the tube for application to the cylinder in the manner previously explained. Furthermore, the rod 148 need not now extend through the cap 154 but may terminate instead flush with the piston 144. The stroke limiting function performed by the nut 167 attached to the rod 148 is now performed by the engagement of a projection on the protruding end of the rod 148 somewhere below the bearing 176 with a stop extending from the bracket 200 or the guides 202. Alternately, the piston 146 and the rod 165 may have an opening beginning at the lower end of the rod 165 and terminating on the face of the piston 146 for introduction of the fluid to operate the tool in the manner previously described.

While air under pressure has been used to bias the piston 146 upwardly, it is pointed out that resilient means such as a spring or other devices of like purpose may be used in the practice of the invention. Furthermore, any suitable fluid under pressure may be used in place of compressed air, and the pressures and dimensions of the device may be changed to increase or reduce the speed of operation.

In the embodiment shown and in the description of the operation of the tool, an electronic component has been used for purposes of illustration, but it will be recognized that the tool is generally useful in forming and/or transporting a diversity of articles and such applications are contemplated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is intended, therefore, to be limited only as indicated by the scope of the following claims.

What is claimed is:

1. A pneumatic tool comprising a casing having centrally located openings at each end, a tubular member slidably received in the first of said openings, a first piston slidable in said casing and having a central opening therethrough and coaxially connected to said tubular member for moving the latter in a forward direction through said first opening and in a reverse direction, a bar slidably received in said tubular member and in the second of said openings in said casing, a second piston slidable in said casing and coaxially connected to said bar between the ends of the latter for driving the same in the forward direction through said first opening and in the reverse direction, said second piston having an opening for the passage of fluid therethrough, means effective to bias said first piston in the reverse direction, means for injecting fluid under pressure between said pistons effective to overcome said biasing means, and means coupling said tubular member to said bar after predetermined displacement of the former in the forward direction.

2. A pneumatic tool comprising a casing having centrally located openings at each end, a tubular member slidably received in the first of said openings, a piston slidable in said casing and having a central opening therethrough and coaxially connected to said tubular member for moving the latter in a forward direction through said first opening and a reverse direction, a bar slidably received in said tubular member and in the second of said openings in said casing, a second piston slidable in said casing and coaxially connected to said bar between the ends of the latter for driving the same in said forward and said reverse direction, said second piston having a pair of openings of different areas for the passage of fluid therethrough, means effective to bias said first piston in the reverse direction, means applying fluid under pressure through the larger of said openings in said second piston and in a direction toward said first piston, and means locking said tubular member to said bar after predetermined displacement of the former in the forward direction.

3. A pneumatic tool comprising a casing having centrally located openings at each end, a tubular member slidably received in a first of said openings, a first piston slidable in said casing and having a central opening therethrough and coaxially connected to said tubular member for moving the latter in a forward direction through said first opening and in a reverse direction, a bar slidably received in said tubular member and in the second of said openings in said casing, a second piston slidable in said casing and coaxially connected to said bar between the ends of the latter for driving the same said forward and said reverse direction, said second piston having a pair of openings therethrough, one opening of larger cross-section than the other, means effective to bias said first piston in the reverse direction, means applying fluid under pressure through said larger opening in said second piston to the space between said first and second pistons, and an article holding device comprising a first element having spaced projections thereon for supporting an article and pivotally coupled to said bar near the tube-supported end, a second element connected to said tubular member and adapted to engage said article upon displacement of said tubular member in said forward direction, and means pivoting said first element upon initial movement of said tubular member in the reverse direction.

4. A pneumatic tool for positioning articles comprising a casing having a central opening at one end, a tubular rod slidably received in said central opening in said casing, a first piston slidable in said casing and having a central opening therethrough and coaxially connected to said tubular rod for moving the latter in a forward direction through said central opening in said casing and in a reverse direction, a bar slidably received in said tubular rod and projecting from the ends of the latter, a second piston slidable in said casing and coupled adjacent an end of said bar removed from said central opening for driving the latter in the forward direction and in the reverse direction, said second piston having an opening therethrough, resilient means positioned between said pistons and engageable therewith, means effective to bias said first piston in the reverse direction to cause said resilient means to displace said second piston when engaged therewith, controllable means providing fluid under pressure between said pistons, means locking said tubular member to said bar after predetermined displacement of the former in the forward direction, and means clasping an article upon forward movement of said tubular member.

5. An article transporting tool comprising a first member movable from a first to a second position and adapted to support an article, a second member movable to said first position for cooperation with said first member to clasp said article, a casing having a central opening in one end, a rod having an axial opening therethrough slidably received in said central opening and projecting from said casing, a first piston slidable in said casing and having a central opening therethrough and coaxially connected to said rod for moving the latter in a forward direction through said central opening in said casing and in a reverse direction, a bar slidably received in said axial opening in said rod and projecting from said central opening in said casing, a second piston slidable in said casing and connected adjacent an end of said bar removed from said central opening for moving the same in said forward and in said reverse direction, said second piston having an opening therethrough, resilient means tending to separate said pistons when in predetermined proximity with respect to each other, means effective to bias said first piston in the reverse direction, means pivotally coupling said first member to the projecting portion of said bar, means connecting said second member to the projecting portion of said rod, means locking said first and second member together in said first position for movement from said first to said second position, means actuated by said rod in moving in the reverse direction from said second position for pivoting said first member free from said article, and means providing fluid under pressure between said first and second pistons.

6. A pneumatic tool comprising a casing having centrally located openings at each end, a tubular member slidably received in a first of said openings, a piston slidable in said casing and having a central opening therethrough and coaxially connected to said tubular member for moving the latter in a forward direction through said first opening and in a reverse direction, a bar slidably received in said tubular member and projecting therefrom through said first opening and slidably received in a second of said openings in said casing, a second piston slidable in said casing and coaxially connected to said bar between the ends of the latter for driving the same in said forward and said reverse directions, said second piston having an opening therethrough, means effective to bias said first piston in the reverse direction, means injecting fluid under pressure between said first and said second pistons, means locking said tubular member to said bar after predetermined displacement of the former in said forward direction, and an article holding device comprising a first element having spaced projections thereon for supporting said article and pivotally coupled to said bar near the tube-supported end, a second element connected to said tubular member and adapted to engage said article upon displacement of said tubular member in said forward direction, and means pivoting said first element upon initial movement of said tubular member in the reverse direction when said fluid injecting means is not operated.

7. An inserting tool comprising a casing having openings at each end, a first combination piston and a rod slidable in said casing and in a first of said openings respectively, said combination having an axial opening therethrough, a second combination piston and rod slidable in said casing and in said axial opening through said first combination piston and rod respectively, said second piston having a pair of spaced openings of different cross-sectional area therethrough, resilient means between said pistons and engageable therewith, means effective to bias said first piston in a direction away from said rod receiving opening in said casing to cause said resilient means to displace said second piston when engaged therewith, a member pivotally connected to said second rod for receiving an article, a member connected to said first rod for clasping said article when said first piston is moved away from said second piston and toward said rod-receiving openings, means coupling the second of said openings in said casing to the larger of said openings in said second piston, means supplying fluid under pressure through said second casing opening, means limiting movement of said first piston and rod combination after predetermined displacement toward said rod-receiving opening in said casing, operable means removing the fluid under pressure when said limiting means is effective, and means pivoting said article-receiving member after said means for removing fluid pressure is operated.

8. A tool comprising a casing having a centrally located opening at one end, a tubular member slidably received in said central opening, a first piston slidable in said casing and having a central opening therethrough and coaxially connected to said tubular member for moving the latter in a forward direction through said opening in said casing, a bar slidably received in said tubular member and projecting from said opening in said casing, a second piston slidable in said casing and coaxially connected to said bar for driving the same in the forward direction through said openings and in the reverse direction, said piston having a pair of openings therethrough, one opening of larger cross-section than the other, resilient means positioned between said pistons and adapted to urge said second piston away from said first piston when said pistons are adjacently spaced by a predetermined amount, means effective to bias said first piston in the reverse direction to cause said resilient means to displace said second piston when engaged therewith, means operable to inject fluid under pressure through said larger opening in said second piston in the direction of said first piston, means locking said tubular member to said bar after predetermined displacement of the former in said forward direction, and means supporting an article operable to clasp and move said article in the forward direction when said fluid under pressure is applied, to release said article when said fluid pressure is removed and to restore when said resilient means urges said second piston away from said first piston.

9. A claim in accordance with claim 8 wherein said last-mentioned means comprises a first element having spaced projections thereon for supporting said article and pivotally coupled to said bar near the tube-supported end, a second element connected to said tubular member and adapted to engage said article upon displacement of said tubular member in said forward direction when said fluid pressure is applied, and means pivoting said first element upon initial movement of said tubular member in the reverse direction when said fluid pressure is removed.

10. A pneumatic tool comprising a casing having a central opening at one end and another opening at the other end, a tubular rod slidably received in said central opening in said casing, a first piston slidable in said casing and having a central opening therethrough and coaxially connected to said tubular rod for moving the latter in a forward direction through said central opening in said casing and in a reverse direction, a bar slidably received in said tubular rod and projecting from the ends of the latter, a second piston slidable in said casing and attached to an end of said bar for driving the latter in said forward direction and in said reverse direction, said piston having a pair of openings therethrough, one opening of larger cross-section than the other, means connecting said other opening in said casing to said opening of larger cross-section in said second piston, resilient means coupled to said first piston and engageable with said second piston, means effective to bias said first piston in the reverse direction to cause said resilient means to displace said second piston when engaged therewith, controllable means providing fluid under pressure to said other opening in said casing, and means locking said tubular member to said bar after predetermined displacement of the former in the forward direction.

11. A pneumatic tool comprising a casing having a central opening at one end and another opening at the other end, a tubular rod slidably received in said central opening in said casing, a first piston slidable in said casing and having a central opening therethrough and coaxially connected to said tubular rod for moving the latter in a forward direction through said central opening in said casing and in a reverse direction, a bar slidably received in said tubular rod and projecting from the ends of the latter, a second piston slidable in said casing and attached to an end of said bar for driving the latter in said forward direction and in said reverse direction, said second piston having an opening therethrough of predetermined cross-section, means injecting fluid under pressure between said pistons including a passage for fluid having a larger cross-section than said opening through said second piston, resilient means urging said pistons apart when adjacently spaced by a predetermined amount, means effective to bias said first piston in said reverse direction and to cause said resilient means to displace said second piston when spaced by a predetermined amount, controllable means providing fluid under pressure between said pistons, means locking said tubular member to said bar after predetermined displacement of the former in the forward direction, and means supporting an article operable to clasp and move said article in the forward direction when said fluid pressure is applied and operable to release said article when said fluid pressure is removed.

12. A claim in accordance with claim 11 wherein said last-mentioned means comprises a first element having spaced projections thereon for supporting said article and pivotally coupled to said bar near the tube-supported end, a second element connected to said tubular member and adapted to engage said article upon displacement of said tubular member in said forward direction when said fluid pressure is applied, and means pivoting said first element upon initial movement of said tubular member in said reverse direction when said fluid pressure is removed.

13. A tool for inserting articles in a card comprising a casing having an axial opening in one end toward said card and an opening for admitting fluid at the other end, a hollow rod having a forked end extending beyond said casing toward said card, said rod slidable in said axial opening, a first piston having an axial opening therethrough and slidable in said casing and fixed to said hollow rod, a bar slidable in said hollow rod and extending from each end of the latter, an article-supporting member pivotally coupled to said bar near said forked end of said rod, a second piston slidable in said casing and connected to said bar, said second piston having a pair of openings from one side of said piston to the other and said openings being of different cross-section, the larger of said openings being constantly connected to said opening in said casing for admitting fluid, means biasing said first piston away from said rod-receiving end of said casing to a first position, means biasing said second piston to a second position when said first piston is in said first position, means coupling said rod and said bar together after predetermined movement of said first piston toward said rod receiving end of said casing, and means applying fluid under pressure to said fluid admitting opening in said casing for causing predetermined movement of said first piston toward said card and movement of said second piston toward said card thereafter.

14. A pneumatic tool comprising a casing having central openings at each end, a tubular member slidably received in a first of said openings, a piston slidable in said casing and having a central opening therethrough and coaxially connected to said tubular member for moving the latter in a forward direction through said first of said openings and in a reverse direction, a bar slidably received in said tubular member and in the second of said openings in said casing, said bar having an axial opening therein extending downwardly through said second of said openings in said casing, a second piston slidable in said casing and coaxially connected to said bar between the ends of the latter for driving the same in said forward and the reverse direction, said second piston having a pair of openings therethrough, one opening being of larger cross-section than the other and connected to said axial opening in said bar thereby forming a path from the outside of said casing which terminates between said pistons, means biasing said first piston in said reverse direction, controllable means injecting fluid under pressure and exhausting same in succession through said axial opening in said bar, and means coupled to said tubular member and said bar for clasping an article upon forward movement of said tubular member when said fluid is injected and for releasing said article only when said fluid is being exhausted.

References Cited in the file of this patent

UNITED STATES PATENTS 2,697,872 Armstrong ---------------- Dec. 28, 1954
2,791,772 Cardani ----------------- May 14, 1957